Aug. 13, 1963     P. C. REDMON     3,100,371
DISPENSER FOR LAWN TREATING MATERIALS
Filed Feb. 12, 1962     2 Sheets-Sheet 1
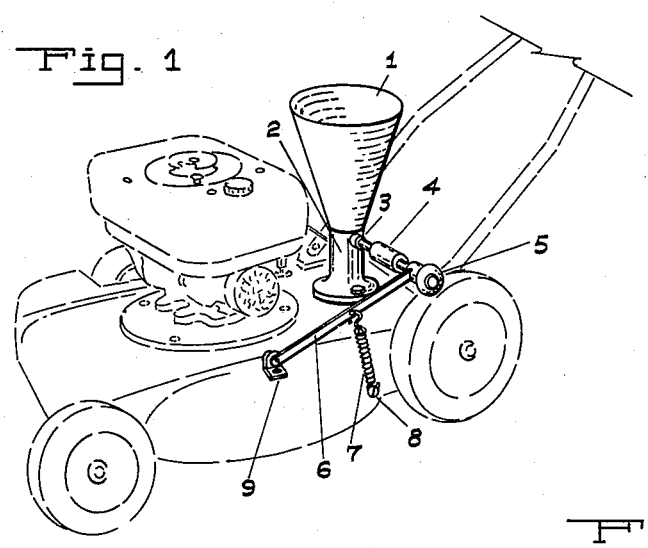
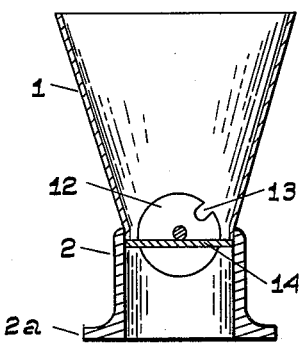
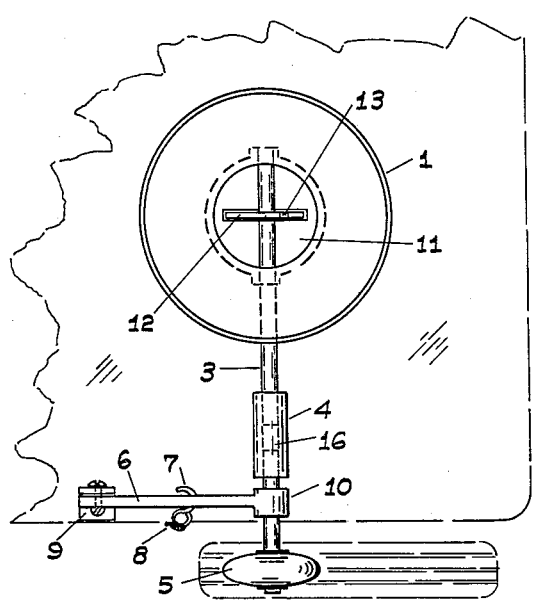
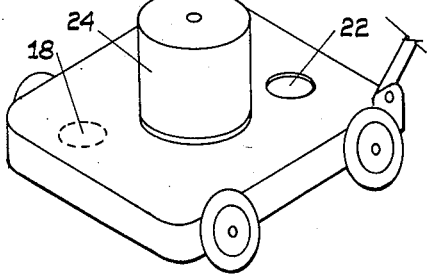
Paul C. Redmon
INVENTOR.
BY Roy L. Van Winkle
Agent Aug. 13, 1963  P. C. REDMON  3,100,371
DISPENSER FOR LAWN TREATING MATERIALS
Filed Feb. 12, 1962  2 Sheets-Sheet 2

Paul C. Redmon
INVENTOR.

BY Roy L. Van Winkle
Agent

United States Patent Office 3,100,371
Patented Aug. 13, 1963

3,100,371
DISPENSER FOR LAWN TREATING MATERIALS
Paul C. Redmon, Oklahoma City, Okla., assignor of two-thirds to Novel Ideas Incorporated, a corporation of Oklahoma
Filed Feb. 12, 1962, Ser. No. 172,396
2 Claims. (Cl. 56—25.4)

This invention relates generally to apparatus useful in conjunction with lawn mowers. More specifically, it relates to appaartus useful for fertilizing, poisoning weeds, seeding, and otherwise preparing or treating lawns or soils in conjunction with lawn mowers.

In the past, particularly with respect to fertilizing, poisoning weeds, and seeding it has been necessary to use separate items of equipment designed specifically for those purposes. All of these things can be done by hand, but with considerable difficulty and with little uniformity. For the home owner, the necessity of using these separate items has presented several problems. First, the expense involved in purchasing such equipment. Second, if not purchased, the trouble and inconvenience of either borrowing or renting such equipment. Third, the problem of storing the equipment when not in use.

Another problem that has plagued anyone who has attempted to maintain a lawn, is the laborious task of attempting to keep it green and healthy. In most locals, it is necessary to supply extra fertility to the soil in the nature of various types of artificial fertilizers. Generally, the fertilizer or plant food is applied once or twice each year in very heavy quantities. With these heavy applications, it is imperative that the lawn be frequently watered to prevent the fertilizer from turning the grass yellow or "burning" it as the color change is sometimes called.

One object of this invention is to provide improved apparatus useful in conjunction with a lawn mower which provides a means for evenly and efficiently treating lawns or soils.

Another object of this invention is to provide improved apparatus in conjunction with a lawn mower that eliminates the need for separate equipment to treat lawns or soils.

A further object of this invention is to provide improved apparatus that will deposit a thin evenly-distributed quantity of fertilizer while the lawn is being mowed.

Still another object of this invention is to provide improved apparatus for treating soils and lawns in conjunction with a lawn mower that feeds only when the mower is moved, automatically compensates for various mower cutting heights, and may be easily adapted for different quantities of treating materials deposited.

A still further object of this invention is to provide improved lawn and soil treating apparatus that is mounted on the lawn mower and is easy and economical to manufacture and use.

One aspect of the invention generally contemplates a feeder assembly adapted to be mounted on a lawn mower having a cutting blade in such a manner that the discharge from the feeder assembly is directed on to the cutting blade of the mower.

Another aspect of the invention generally contemplates a lawn mower having a cutting blade thereon, a feeder assembly mounted on the mower whereby materials fed through the feeder assembly are directed into the path of the cutting blade.

Other, further, and additional objects and advantages of the invention will become more apparent when the following description is read in conjunction with accompanying drawing wherein like reference characters denote like parts in all views and wherein:

FIGURE 1 is a pictorial view of apparatus constructed in accordance with the invention mounted on a lawn mower.

FIGURE 2 is an enlarged cross-sectional view of part of a feeder assembly constructed in accordance with the invention.

FIGURE 3 is an enlarged plan view of apparatus constructed in accordance with the invention and showing a portion of a lawn mower upon which it is mounted.

FIGURE 4 is a pictorial view illustrating a different type mower and possible locations for the feeder assembly.

Figure 5:
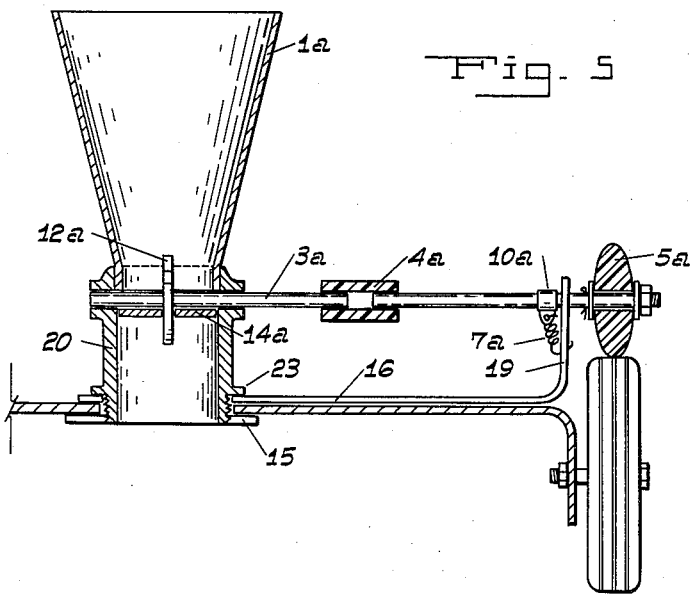
FIGURE 5 is a view partly in cross-section and partly in elevation of an alternate method of mounting the apparatus on a lawn mower.

Referring to the drawing and to FIGURE 1 in particular, shown therein is a feeder assembly constructed in accordance with the invention mounted on a rotary-type lawn mower shown in dashed lines.

The feeder assembly includes a hopper 1 which is illustrated as being of conical shape. While this is probably the most economical configuration to manufacture, the hopper 1 may have any desirable shape so long as treating materials placed therein will move toward its lower end.

A hollow body member 2 of the feeder assembly is adapted at one end to be mounted on the mower and at the other end to receive the outlet end of the hopper 1. One method of mounting the body member 2 is by means of bolting through the flange 2a and the mower housing. If desired, the body 2 can be integrally formed with the mower housing.

If the particular type of lawn mower used has a cover over the cutting blade, then a hole must be formed in the lower housing and the interior of the body member 2 aligned with the hole. FIGURE 4 illustrates a mower driven by an electric motor 24. Due to the variations in mower cases, methods of driving the mower, and in wheel arrangement, the feeder assembly cannot be located in the same position on all mowers. FIGURE 4 also illustrates at 18 and 22 at least two possible locations for holes in the mower case and for the position of the feeder assembly.

A feeder member 12 having one or more notches 13 formed therein is located in the upper interior of the body member 2. The feeder member 12 is mounted on a drive shaft 3 that extends through the wall of the body member 2. The number and size of the notches 13 may be varied depending upon the quantity of material to be delivered.

Figure 8:
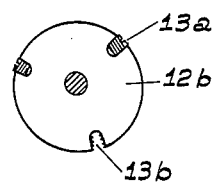
FIGURE 8 is an elevation view of an alternate feeder member.

An alternate method of construction is shown in FIGURE 8 for the feeder member 12. Shown therein is a member 12a having three threaded notches 13b in its outer periphery. Threaded plugs 13a are adapted to be inserted therein to fill or partially fill the notch 13b. All may be partially filled or part may be completely filled thus providing for a variation in the amount of treating material dispensed. Obviously, there are many methods of constructing such a member which are readily apparent to those skilled in the art.

A slotted baffle plate 14 is positioned across the hollow interior of the body member 2. The slot therein is constructed so that it fits rather closely about that portion of the feeder member 12 extending through the baffle plate 14.

One end of the drive shaft 3 is rotatably mounted in the body member 2. As shown in FIGURE 3, the shaft 3 is made in two sections which are joined by means of a flexible coupling 4. The coupling 16 preferred is of tubular construction having a passageway 16 extending therethrough. Other commercially available flexible couplings may be used. A wheel 5 is mounted on the other end of the shaft 3. The wheel 5 is fixed to shaft 3 so that when the wheel 5 is in contact with a rotating mower wheel the shaft 3 is caused to rotate.

Journalled on shaft 3 between the flexible coupling 4 and wheel 5 is end portion 10 of arm 6. The opposite end of arm 6 is pivotally mounted on a bracket 9. Bracket 9 may either be integral with or mounted on the mower housing.

A spring 7 is attached at one end to the arm 6 and its other end is releasably attached at 8 to the mower housing. One purpose of the spring 8 is to maintain some force on the wheel 5 through the arm 6 to assure that the wheel 5 is frictionally engaged with the mower wheel.

It is highly desirable where the dispenser is to be installed on existing mowers to be able to provide an assembly that can be installed as simply as possible. Illustrated in FIGURES 5, 6, and 7 is an alternate arrangement wherein it is necessary to drill only one hole in the mower housing.

As shown in FIGURE 5, the alternate assembly includes a hopper 1a installed on a body member 20. Body member 20 extends through the mower housing and is either threaded therein or is provided with threads whereby nut 15 can be screwed thereon retaining the assembly in the housing.

Figure 6:
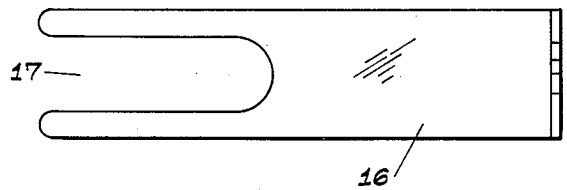
FIGURE 6 is an enlarged plan view of the adjusting bracket shown in elevation in FIGURE 5.
Figure 7:
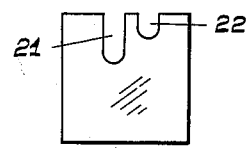
FIGURE 7 is an enlarged end view of the adjusting bracket.

A shaft guide and retainer 16 is illustrated in detail in FIGURES 6 and 7. Its purpose is severalfold. It serves to provide a width adjustment to compensate for different mower widths and mounting positions of the dispenser. This is accomplished by inserting slot 17 about the body 20 between flange 23 and the mower cover. Nut 15 is tightened when the guide 16 is adjusted to the proper width. Shaft 3a is adjustable in coupling 4a to compensate for the wheel position.

Elongated slot 21 permits vertical movement of shaft 3a. This is provided because of the ability of most mowers to be adjusted for various cutting heights. Slot 21 also limits the horizontal movement of the shaft 3a so that wheel 5a cannot become mis-aligned with the mower wheel.

Slot or notch 22 is provided so that the shaft 3a can be placed therein and the wheel 5a will not be in contact with the mower wheel. This feature may be used when the hopper is filled and it is not desired to treat the lawn.

Spring bracket 10a and spring 7a serve the identical purpose as their alternate parts 10 and 7.

*Operation*

The hopper 1 is filled with treating material. The spring 7 is attached to the mower housing at 8 so that force is applied to the arm 6. Due to the tension in the spring 7, the wheel 5 is held in frictional engagement with the lawn mower wheel.

As the mower is moved about the yard, the mower wheel drives the wheel 5 which rotates attached shaft 3. The rotation of shaft 3 is transmitted to the feeder member 12. Notch 13 is filled with treating material as it moves through the upper interior of body 2. As the feeder member 12 rotates with shaft 3, the material is dropped from the notch 13 beneath the baffle plate 14.

The baffle plate 14 is constructed so that it prevents the treating material from passing through the feeder assembly. Another important purpose of the baffle plate 14 is to prevent air pressure, which is created beneath some mower housings, from blowing upwardly through the hopper 1.

Treating material discharged from notch 13 falls onto the rotating cutting blade of the lawn mower. As the material strikes the cutting blade of the mower it is scattered and distributed about the area covered by the mower.

The feeder assembly does not operate unless the mower is moving, thus the treating material is discharged only when the mower is moving, and at a speed relative to the speed of the mower. This provides for even distribution over large areas without having spots which have received large quantities of the material because of the mower being stopped.

One of the greatest advantages of apparatus constructed in accordance with the invention is when it is used with fertilizer. First, the lawn can be fertilized while mowing thus eliminating the additional labor and inconvenience required to fertilize separately. Second, the fertilizer is scattered evenly and as thin or heavy as desired about the lawn.

As previously mentioned, another advantage of the invention is that it eliminates the storage problem of the separate equipment ordinarily required in treating lawns and soils. It also allows the one implement to be used separately from the other if soil conditioning is desired when the grass is not growing, or if the cutting is desired and not the treating.

In addition to these advantages, several others are present in the apparatus. For example, the quantity of treating material discharged can be varied by either changing the size of the wheel 5 or by changing the number of notches 13 in the feeder member 12.

Changing the number of notches 13 can be accomplished by changing the feeder member 12, or as otherwise provided herein. The feeder member 12 can be easily changed by slipping one end of shaft 3 into the opening 16 of coupling 4 until the member 12 can be slipped off the shaft 3.

Another advantage of the apparatus is that the cutting height of the mower can be varied at will and the feeder assembly will continue to function without adjustment. This is possible because of the flexible coupling 4 permits movement of the wheel end of shaft 3 relative to the other end and the spring 7 will maintain wheel 5 in frictional engagement with the mower wheel.

It is believed obvious from the foregoing that apparatus constructed in accordance with the invention presents many novel features and advantages not heretofore known.

It should be apparent that the foregoing represents but a specific example of apparatus constructed in accordance with the invention and that many variations may be made thereto without departing from the spirit of the invention or from the scope of the annexed claims.

I claim:

1. In combination with a conventional lawn mower having a cutting blade and supporting wheels, the invention comprising,
    (1) a body member mounted on said mower over said cutting blade,
    (2) a hopper member mounted on said body member,
    (3) said body member having a passageway extending therethrough in communication at one end with said hopper member,
    (4) a shaft extending through at least one wall of said body member and rotatable therein,
    (5) a disc-like feeder member located within said body and mounted on said shaft,
    (6) said feeder member having at least one notch formed in the periphery thereof,
    (7) a baffle plate extending across said passageway and surrounding a portion of said feeder member thereby preventing the upward movement of materials thereby while permitting rotation of said feeder member,
    (8) a flexible coupling member mounted on one end portion of said shaft,
    (9) a drive shaft member connected to said flexible coupling member,

(10) a wheel mounted on the other end of said drive shaft member, and

(11) resilient means adapted to maintain said wheel in frictional engagement with one of said mower supporting wheels.

2. In combination with a conventional lawn mower having a cutting blade and supporting wheels, the invention comprising, (1) a material feeder assembly mounted over said cutting blade, said feeder assembly includes:
   (a) a body member mounted on said mower,
   (b) a hopper member mounted on said body member,
   (c) said body member having a passageway extending therethrough in communication at one end with said hopper member,
   (d) a feeder member rotatably mounted in said passageway, and
   (e) a baffle plate extending across said passageway and surrounding a portion of said feeder member thereby preventing the upward movement of materials thereby while permitting rotation of said feeder member, and (2) means for rotating said feeder member driven by one of the supporting wheels of said mower.

References Cited in the file of this patent

UNITED STATES PATENTS

| | | |
|---|---|---|
| 1,129,338 | Davis | Feb. 23, 1915 |
| 2,742,751 | Laughlin | Apr. 24, 1956 |
| 2,792,970 | Gaiman | May 21, 1957 |
| 2,878,633 | Mullin | Mar. 24, 1959 |
| 2,991,914 | Janssen | July 11, 1961 |